United States Patent [19]

Thornton et al.

[11] 4,180,885
[45] Jan. 1, 1980

[54] WINDSHIELD WIPER

[75] Inventors: Donald I. Thornton, Warwick, R.I.; Richard H. Peyton, Berkley, Mass.

[73] Assignee: Fram Corporation, East Providence, R.I.

[21] Appl. No.: 800,694

[22] Filed: May 26, 1977

[51] Int. Cl.² .................................................. B60S 1/40
[52] U.S. Cl. .............................. 15/250.32; 15/250.42
[58] Field of Search .......................... 15/250.31–250.42

[56] References Cited

U.S. PATENT DOCUMENTS

| | | | |
|---|---|---|---|
| 3,585,672 | 6/1971 | Habert | 15/250.42 |
| 3,922,749 | 12/1975 | Castleman, Jr. et al. | 15/250.42 |
| 3,942,212 | 3/1976 | Steger et al. | 15/250.42 |
| 3,961,394 | 6/1976 | Steger | 15/250.32 |
| 4,014,066 | 3/1977 | Harbison et al. | 15/250.42 |

FOREIGN PATENT DOCUMENTS

| | | | |
|---|---|---|---|
| 2331324 | 1/1974 | Fed. Rep. of Germany | 15/250.32 |
| 1376423 | 9/1964 | France | 15/250.32 |
| 2118202 | 7/1972 | France | 15/250.32 |
| 901436 | 7/1962 | United Kingdom | 15/250.32 |
| 1183446 | 3/1970 | United Kingdom | 15/250.42 |

Primary Examiner—Peter Feldman

[57] ABSTRACT

A pressure distributing superstructure for a windshield wiper, comprising a plastic primary yoke having at each end oppositely extending, coaxial pins and a lobe beyond the pins, and two plastic secondary yokes, each having a pair of ears spaced apart along the axis of the pins, the ears of each pair having opposing openings for receiving the pins of one end of the primary yoke, a shoulder above each opening to retain the pins therein, and a downwardly and inwardly sloping ramp above each shoulder, the ends of said pins of a pair being separated by more than the minimum spacing of the ramps, the ears being sufficiently resilient so that when the pins are forced between the ramps the ears will temporarily be flexed apart to allow the pins to snap into the openings.

3 Claims, 6 Drawing Figures

U.S. Patent  Jan. 1, 1980  4,180,885
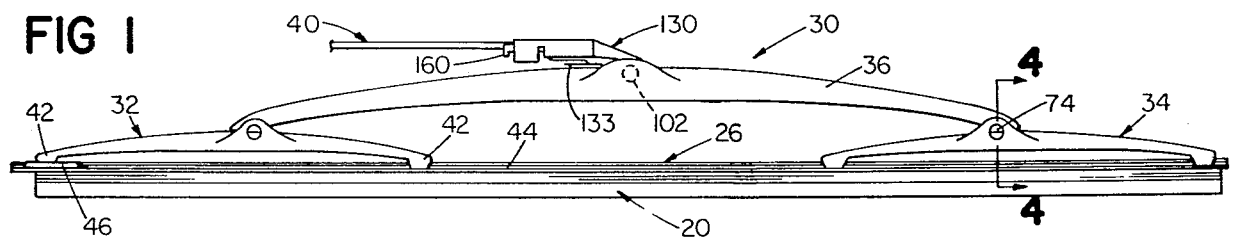
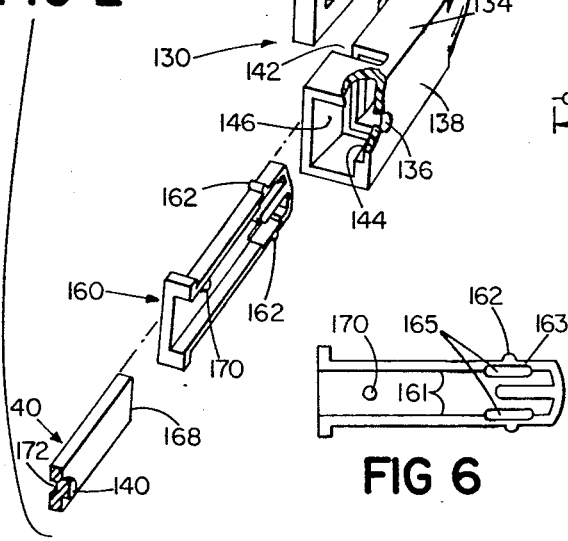
FIG 2
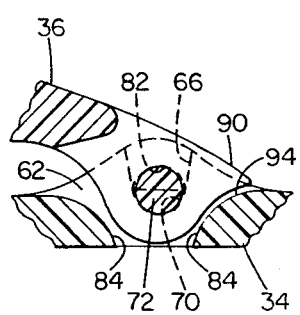
FIG 4   FIG 5
FIG 3
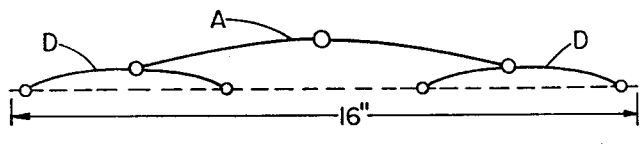
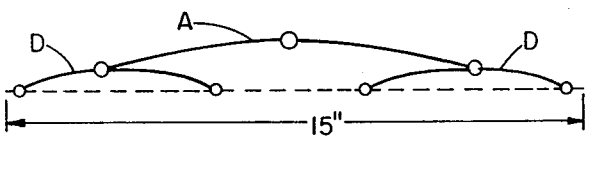
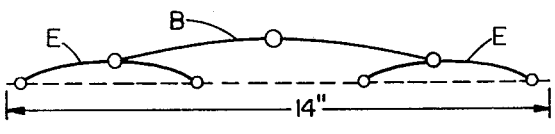
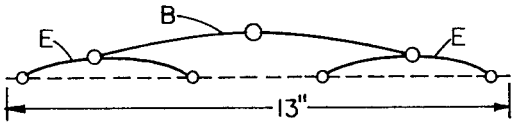
FIG 6

WINDSHIELD WIPER

BACKGROUND OF THE INVENTION

This application relates to windshield wipers.

Typical modern windshield wipers have a rubber squeegee supported by a stay-like backing strip for flexure in planes normal to the windshield, and a superstructure consisting of primary and secondary yokes for distributing pressure from the motor-driven wiper arm to the backing strip and squeegee.

Such wipers have for years been supplied in a variety of sizes and styles to accommodate the various models of automobiles. Not only are some windshields larger than others, necessitating longer squeegees, backing strips, and superstructures, but the design of the wiper arm connection to the primary yoke also varies. Thus, some arms have a straight end for a so-called bayonet connection, while others have bent ends for a so-called shepherd's crook connection. Still other arms require a so-called side lock connection.

A recent development in the windshield wiper industry has been the use of plastic backing strips and superstructures. One patent disclosing the use of plastic is Castleman et al U.S. Pat. No. 3,922,749, in which the secondary yokes are each provided with more than one aperture at which an end of the primary yoke can be pivotally connected.

SUMMARY OF THE INVENTION

In its various aspects the invention provides an improved connection between primary and secondary yokes, allowing, in operation, free pivoting between the yokes, yet with substantial lateral rigidity of the superstructure relative to planes normal to the windshield, all in such a way as to make manufacture and installation simple and foolproof. The invention also simplifies and makes more economical the production of wipers in various sizes, and allows the use of a given wiper with differently sized wiper arms of both the bayonet and shepherd's crook style.

In one aspect the invention features spaced ears on each secondary yoke with openings to receive pins of the primary yoke ends as the pins snap past ramped shoulders above the openings. In another aspect the invention features longitudinally asymmetric pivoting of secondary yokes at the ends of long and short primary yokes, in varying combinations to provide at least four superstructure lengths. The invention also features a plastic adaptor having a shepherd's crook at one end and a receptacle for a bayonet wiper arm at the other end.

Other advantages and features of the invention appear below.

BRIEF DESCRIPTION OF THE DRAWINGS

FIG. 1 is a side view of a presently preferred wiper embodying the invention;

FIG. 2 is an exploded isometric view of portions of the wiper of FIG. 1;

FIG. 3 is a schematic view showing primary and secondary yokes of different lengths in different combinations;

FIG. 4 is a fragmentary sectional view through 4—4 of FIG. 1; and

FIG. 5 is a fragmentary sectional view through 5—5 of FIG. 4.

FIG. 6 is a plan view of a shim.

DESCRIPTION OF THE PREFERRED EMBODIMENT

Referring to the drawings, rubber squeegee 20 is retained by its head 22 (FIG. 2) in the recess 24 of plastic backing strip 26. Superstructure 30 has plastic secondary yokes 32 and 34 pivoted at the ends of primary yoke 36, which is in turn shown in FIG. 1 connected to bayonet style wiper arm 40. Both primary and secondary yokes are provided with several slots 37, which extend entirely through the yokes. Claws 42 at the ends of the secondary yokes slide in external grooves 44 of the backing strip. Generally U-shaped plastic lock 46 is mounted at one end of the backing strip to receive a claw at one end of the superstructure, thereby retaining the wiper in assembled condition.

The pivotal connections between the primary and secondary yokes are as shown in FIGS. 2, 4, and 5. Each secondary yoke is enlarged and apertured to provide a pair of opposing ears 60 and 62, recessed to provide downwardly and inwardly sloping ramps 64 and 66, and, below the ramps, having circular openings 68 and 70. Each primary yoke end has a pair of laterally protruding, coaxial pins 72 and 74, with the lower halves of their ends bevelled at 76 and 78. The pins are shaped to snap into openings 68 and 70 after sliding down ramps 64 and 66, forcing the ears apart slightly in the process. Shoulders 80 and 82 provided by the ramps prevent subsequent withdrawal of the pins and thus hold the yokes permanently pivotally connected.

Between ears 60 and 62 yoke surfaces 84 are contoured to permit the free yoke-to-yoke pivoting required for conformance of the squeegee to curved windshields. However, at the very end of each primary yoke is a generally wedge shaped lobe 90 which by abutment with secondary yoke stop surface 94 limits the upward pivotal movement of the outside ends of the secondary yokes, so as to facilitate manual control over the positions of the secondary yokes while the superstructure and backing strip are being assembled.

The provision of enlarged ears 60 and 62 and lobes 90 also serves to increase the surface area of primary-to-secondary yoke bearing contact in planes normal to the pivot axis (and the windshield surface), thus providing substantial lateral rigidity of the superstructure relative to such planes.

The secondary yokes are asymmetric longitudinally about ears 60 and 62. The overall length of the superstructure thus depends upon whether the secondary yokes are assembled with their short or long legs outboard of the primary yoke ends. As shown in FIG. 3, a given set of one primary and two identical secondary yokes can be used for either of two alternate superstructure lengths, while always providing for pressure distribution to four points on the backing strip symmetric about the midpoint of the primary yoke. Each secondary yoke leg is marked next to its pivot with the superstructure length that results if that leg is put in the outboard position. Thus, inventory requirements are reduced while providing for easy and foolproof snap-together assembly of yokes in the desired superstructure lengths. For example, as shown in FIG. 3, only six different yokes (three primary yoke lengths (A, B, C) and three secondary yoke lengths (D, E, F)) need be stocked to manufacture six different wiper sizes (11", 12", 13", 14", 15", 16").

The primary yokes are each made with a central slot 100 across which extends a pin 102. These primary yokes can be attached to a shepherd's crook arm in conventional fashion.

So that the same primary yoke can be used with shepherd's crook arms of different widths, one or more plastic spacers 110 are provided. The spacer has side walls 112 and slightly flaring end walls 114. The side walls are notched at 120 to allow the end walls to be flexed toward each other to insert the spacer into slot 100, after which the end walls are released to allow tabs 122 to snap over shoulders 124 adjacent the ends of the slot. The end walls 125 of slot 100 slope upwardly and toward each other to provide ramps which act against tabs 122 to flex the spacer end walls upon installation of the spacers from the underside of the primary yoke. Side walls 112 are also notched at 126 to receive pin 102. The spacer serves to narrow slot 100 to match the wiper arm width.

Plastic adaptor 130 is provided to allow the same primary yokes to be used with the bayonet style arms. The adaptor has a front portion 132 in the form of a shepherd's crook for installation into slot 100 with the use of metal spring 133, and a rear, box-like portion 134 designed to receive a wide bayonet arm. Receptacle 134 has a hole 136 in its top wall 138 to receive bayonet arm knob 140, and has its bottom and side walls slotted at 142 so that the top wall can be flexed and pin 140 withdrawn from hole 136 to remove the arm. Wall 138 is relieved at 144 to provide a ramp for guiding knob 140 into hole 136. The opposite wall slopes at 146 to facilitate entrance of the arm itself. Spring 133 has a loop 150 which snaps over pin 102, and normally diverging legs 152 and 154 which must be flexed toward each other to fit the spring into crook 132. The spring legs have lance tabs 156, one of which snaps into recess 158 in the crook to hold the spring in place. Legs 152 and 154 also have slots 157, one of which receives lug 159 on the interior of the crook opposite recess 158, adding overall stiffness. In use the spring is first snapped over pin 102 and then crook 132 is forced over the spring.

Spacers 110 can also be used with the adaptors, so that a single adaptor, designed to fit directly in a relatively narrow slot of the shortest primary yoke, will also fit (with a spacer) in a wider slot of a longer primary yoke.

A shim 160 is provided to accomodate the adaptor to narrow bayonet arms between side walls 161. The shim fits into receptacle 134 and has laterally projecting ridges 162 which snap into side slots 142 to hold the shim in a ready position. The bayonet arm is then inserted between the shim and wall 138 and forces the shim further into the receptacle until knob 140 snaps into hole 136. As shown in FIG. 6, locally thinner side wall portions 163 and slots 165 allow resilient inward movement of ridges 162. Knob 170 on the shim fits into a recess 172 on the underside of the arm to help hold the arm and shim together during operation.

Other embodiments are within the following claims.

What is claimed is:

1. A pressure distributing superstructure for a windshield wiper, comprising a plastic primary yoke having at each end oppositely extending, coaxial pins and a lobe beyond said pins, and two plastic secondary yokes, each having a pair of ears spaced apart along the axis of said pins, said ears of each said pair having opposing openings for receiving said pins of one end of said primary yoke, a shoulder above each said opening to retain said pins therein, and a downwardly and inwardly sloping ramp above each said shoulder, the ends of said pins of a said pair being separated by more than the minimum spacing of said ramps, said ears being sufficiently resilient so that when said pins are forced between said ramps said ears will temporarily be flexed apart to allow said pins to snap into said openings, each said secondary yoke being assymmetric longitudinally about said ears, whereby said yoke has long and short legs on opposite sides of said ears, each said secondary yoke having between its said ears a pair of contoured stop surfaces convex to said pins, said ears having opposing, parallel bearing surfaces extending between said stop surfaces and said pins as well below said openings, the ends of said primary yoke including said lobes having bearing surfaces normal to said axis and surrounding said pins, said bearing surfaces of said primary yoke being in bearing contact with those of said secondary yoke, said lobes having concave bottom surfaces at their ends extending beyond said pins to overlie said convex stop surfaces to limit the upward pivotal movement of the outer ends of said secondary yoke about said axis.

2. A pressure distributing superstructure for a windshield wiper, comprising a plastic primary yoke having at each end oppositely extending, coaxial pins and a lobe beyond said pins, and two plastic secondary yokes, each having a pair of ears spaced apart along the axis of said pins, said ears of each said pair having opposing openings for receiving said pins of one end of said primary yoke, a shoulder above each said opening to retain said pins therein, and a downwardly and inwardly sloping ramp above each said shoulder, the ends of said pins of a said pair being separated by more than the minimum spacing of said ramps, said ears being sufficiently resilient so that when said pins are forced between said ramps said ears will temporarily be flexed apart to allow said pins to snap into said openings, said primary yoke having a centrally located slot and a cross pin therein and integral with said primary yoke to receive a shepherd's crook wiper arm, said superstructure further comprising a spacer adapted to be inserted into said slot to reduce its width to accommodate a shepherd's crook arm of correspondingly reduced width, slot to reduce its width to accommodate a shepherd's crook arm of correspondingly reduced width, said spacer having opposing plastic side walls to reduce said width of said slot, plastic end walls extending between said side walls, and tabs extending outwardly from the tops of said end walls, the overall length of said spacer including said tabs being greater than the corresponding length of said slot, said spacer having slots adjacent said end walls to permit said tabs to be flexed inwardly during insertion of said spacer into said slot and to then return to its unflexed position to retain said spacer in said slot, the tops of said side walls being notched to receive said cross pin, said primary yoke having shoulders at the ends of said slot to receive said tabs, and ramps beneath said shoulders to force said tabs toward each other during insertion of said spacer.

3. A pressure distributing superstructure for a windshield wiper, comprising a plastic primary yoke having at each end oppositely extending, coaxial pins and a lobe beyond said pins, and two plastic secondary yokes, each having a pair of ears spaced apart along the axis of said pins, said ears of each said pair having opposing openings for receiving said pins of one end of said primary yoke, a shoulder above each said opening to retain said pins therein, and a downwardly and inwardly sloping ramp above each said shoulder, the ends of said pins of a said pair being separated by more than the minimum spacing of said ramps, said ears being sufficiently resilient so that when said pins are forced between said ramps said ears will temporarily be flexed apart to allow said pins to snap into said openings, said primary yoke having a centrally located slot and a cross pin therein and integral with said primary yoke to receive a shepherd's crook wiper arm, said superstructure further comprising a plastic adaptor having a shepherd's crook at one end adapted to be received in said slot, and a receptacle for a bayonet wiper arm at the other end, said receptacle having a top wall with a hole in it to receive a bayonet arm knob, and slots in its bottom and side walls to permit said top wall to be flexed, said superstructure further comprising a shim to accommodate said receptacle to a small bayonet arm, said shim having laterally projective ridges to snap into said slots of said side walls, said slots being located sufficiently far toward the entrance end of said receptacle so that, when said ridges are in said slots said shim is in a ready position short of final insertion of said arm in said receptacle.

* * * * *